(12) United States Patent
Hamada et al.

(10) Patent No.: US 7,035,503 B2
(45) Date of Patent: Apr. 25, 2006

(54) OPTICAL TRANSMISSION APPARATUS

(75) Inventors: Tsutomu Hamada, Kanagawa (JP);
Takeshi Kamimura, Kanagawa (JP);
Kazuhiro Suzuki, Kanagawa (JP);
Kazuhiro Sakai, Kanagawa (JP);
Masashi Hisada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 116 days.

(21) Appl. No.: 10/388,659

(22) Filed: Mar. 17, 2003

(65) Prior Publication Data

US 2004/0017966 A1 Jan. 29, 2004

(30) Foreign Application Priority Data

Jul. 25, 2002 (JP) .............................. 2002-216432

(51) Int. Cl.
*G02B 6/28* (2006.01)
*H04B 10/20* (2006.01)
*H04B 7/212* (2006.01)

(52) U.S. Cl. ........................ 385/24; 370/347; 370/468; 398/58

(58) Field of Classification Search ................... 385/24
See application file for complete search history.

(56) References Cited

U.S. PATENT DOCUMENTS

| 5,013,118 | A | * | 5/1991 | Sniadower ................... 398/144 |
| 5,220,562 | A | * | 6/1993 | Takada et al. .............. 370/404 |
| 5,446,846 | A | * | 8/1995 | Lennartsson ................ 710/100 |
| 5,502,544 | A | * | 3/1996 | Carolan ........................ 399/46 |
| 5,590,284 | A | * | 12/1996 | Crosetto ....................... 712/29 |
| 5,956,169 | A | * | 9/1999 | Shimizu ..................... 398/155 |
| 5,970,067 | A | * | 10/1999 | Sathe et al. ................ 370/394 |
| 6,370,159 | B1 | * | 4/2002 | Eidson ........................ 370/503 |
| 6,504,853 | B1 | * | 1/2003 | Lindgren et al. ........... 370/468 |

FOREIGN PATENT DOCUMENTS

| JP | A-2-41042 | 2/1990 |
| JP | B2-5-61821 | 9/1993 |
| JP | A-08-166842 | 6/1996 |
| JP | A-10-268147 | 10/1998 |

* cited by examiner

*Primary Examiner*—Michelle Connelly-Cushwa
*Assistant Examiner*—Tina M Wong
(74) *Attorney, Agent, or Firm*—Oliff & Berridge, PLC

(57) ABSTRACT

Master node #0 and a plurality of slave nodes #1 to #4 are connected to one another via a plurality of optical couplers 20. Each of the nodes is controlled so that signal transmission between the nodes by a bus connection and a link connection is conducted via the optical couplers. In the link connection, the master node transmits bit signals corresponding to the number of the slave nodes. Each of the slave nodes transmits a bit signal with allocating the signal to a predetermined bit.

8 Claims, 3 Drawing Sheets

OPTICAL TRANSMISSION APPARATUS

BACKGROUND OF THE INVENTION

1. Field of the Invention

The present invention relates to an optical transmission apparatus in which a plurality of nodes are connected to one another via optical couplers.

2. Description of the Related Art

Conventionally, a connection between nodes such as boards (circuit boards) or apparatuses is electrically conducted by a configuration shown in FIG. 1. As shown in FIG. 1, depending on the kind of a signal, nodes #0 to #N are bus-connected to one another via a bus 10, or link connections between node #0 and nodes #1 to #N are conducted in a one-to-one relationship via signal lines 11.

A method in which an optical bus is used in order to bus-connect at a high speed a plurality of nodes to one another is known. For example, JP-B-5-61821 discloses a technique in which nodes are bus-connected by connecting fibers of one-to-one connection in cascade. JP-A-2-41042 discloses a serial optical data bus for loop transmission between circuit boards in which two sets of light emitting/light receiving devices are placed on the front and rear faces of the circuit boards, and the light emitting/light receiving devices of adjacent ones of the circuit board mounted on a system frame are coupled to one another spatially and optically. JP-A-8-166842 and JP-A-10-268147 disclose a bus connection using an optical star coupler.

Among the methods using an optical bus, however, the method in which cascade connection is conducted has a problem in latency, and the other methods have a problem in that an addition of a one-to-one link connection is not considered. When the example of the electrical connection shown in FIG. 1 is to be configured by using an optical system, a method may be employed in which optical fiber couplers are used in the bus connection and one-to-one connections of optical fibers are used in the link connection. However, this method has a problem in that the configuration is complicated depending on the kind or the number of signal lines.

SUMMARY OF THE INVENTION

It is an object of the invention to provide an optical transmission apparatus in which both a bus connection and a link connection are enabled in optical connections between plural nodes.

The object is attained by an optical transmission apparatus in which a plurality of nodes are interconnected via a plurality of optical couplers, wherein each of the nodes conducts signal transmission for a bus connection and a link connection via the optical couplers.

In this case, the apparatus may be configured so that a master node is connected to one end of each of the optical couplers, and a plurality of slave nodes are connected to other ends of the optical couplers. For the link connection, the master node may transmit bit signals corresponding to the number of slave nodes, and the bit signals corresponding to the number of slave nodes may serialize before transmission. In transmission of a signal, each of the slave nodes may transmit a bit signal with allocating the signal to a predetermined bit, and, in reception, may receive only a necessary bit signal.

According to the configuration, both a bus connection and a link connection are enabled in connections between plural nodes.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, an embodiment of the invention will be described in detail with reference to the accompanying drawings.

Figure 1:
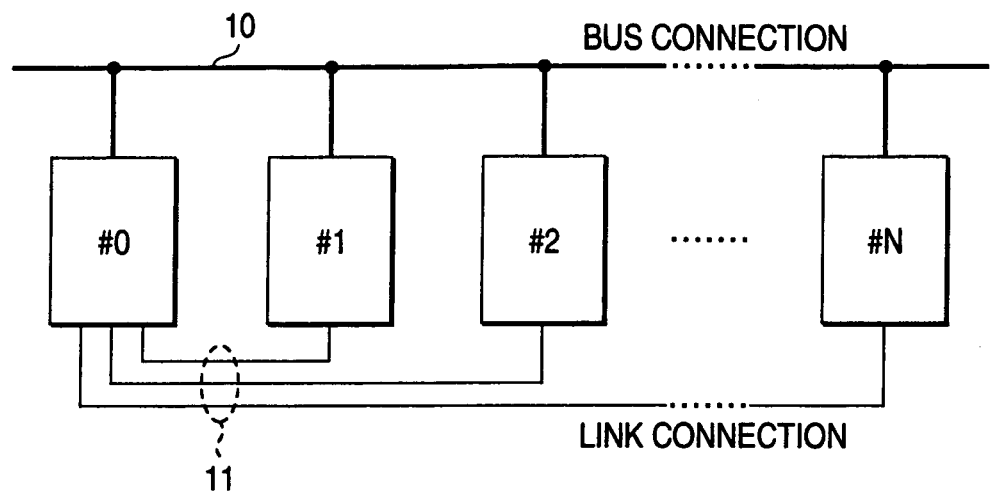
FIG. 1 is a diagram showing an example of a transmission apparatus in which a bus connection and a link connection between nodes are electrically conducted.
Figure 2:
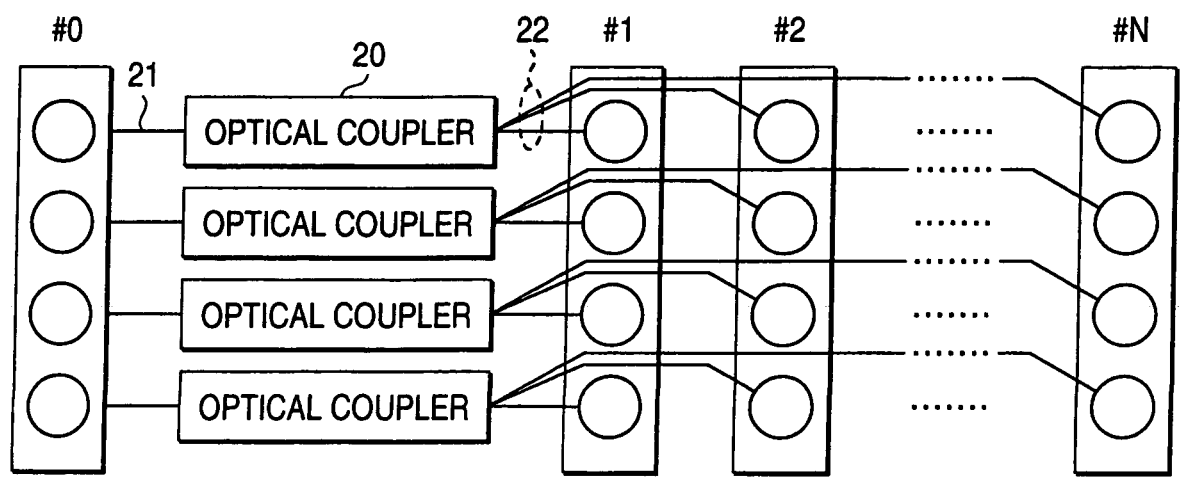
FIG. 2 is a diagram showing an embodiment of the optical transmission apparatus of the invention.

FIG. 2 is a diagram showing an embodiment of the optical transmission apparatus of the invention. The embodiment is configured by a master node, slave nodes, and optical couplers. In the case of a one-to-N connection, the master node is a node on the side of "one", and the slave nodes are nodes on the side of "N". In the embodiment, as shown in the figure, master node #0 and slave nodes #1 to #N are connected to one another via a plurality of optical couplers 20 by optical transmission paths 21 and 22 such as optical fibers. When one-to-N optical couplers are used as in the embodiment, it is possible to realize connections between (N+1) nodes. Moreover, each of the nodes is controlled so that, in optical connections between the master node and the slave nodes, signal transmission by a bus connection and a link connection is conducted via the optical couplers. Therefore, both a bus connection and a one-to-one link connection are enabled in the optical transmission apparatus. This will be described in detail.

Figure 3:
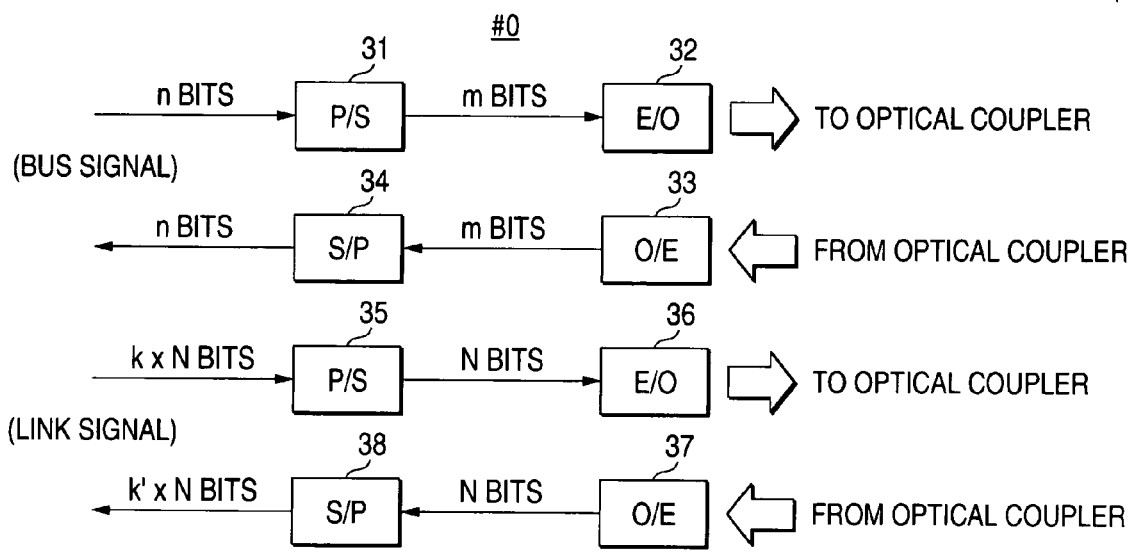
FIG. 3 is a block diagram showing an example of the configuration of a master node in the case where both a bus connection and a link connection are enabled.

FIG. 3 is a block diagram showing an example of the configuration of the master node in the case where both a bus connection and a link connection are enabled. The case where an n-bit bus signal is to be transmitted from the master node to the slave nodes will be described. In this case, as shown in the figure, the bus signal (parallel signal) is serialized in n:m by a parallel/serial converter 31 in accordance with the transmission speed. The m-bit serial signal is converted into a light signal by an electrooptic converter 32, and the light signal is transmitted via the optical couplers and the like. By contrast, a serialized m-bit light signal which has been transmitted to the master node via the optical coupler and the like is converted into an electric signal by an optoelectric converter 33, and the electric signal is parallelized in m:n by a serial/parallel converter 34 to be received as a bus signal.

A link signal in the master node is transmitted as a (k×N)-bit signal corresponding to the number N of the slave nodes. In this case, the link signal is serialized (in k:1) by a parallel/serial converter 35 as required to be converted into an N-bit serial signal. The N-bit serial signal is converted into a light signal by an electrooptic converter 36, and the light signal is transmitted via the optical couplers and the like. By contrast, a serialized N-bit light signal which has been transmitted to the master node via the optical coupler and the like is converted into an electric signal by an optoelectric converter 37, and the electric signal is parallelized (in 1:k') by a serial/parallel converter 38 to be received as a (k'×N)-bit parallel signal.

Figure 4:
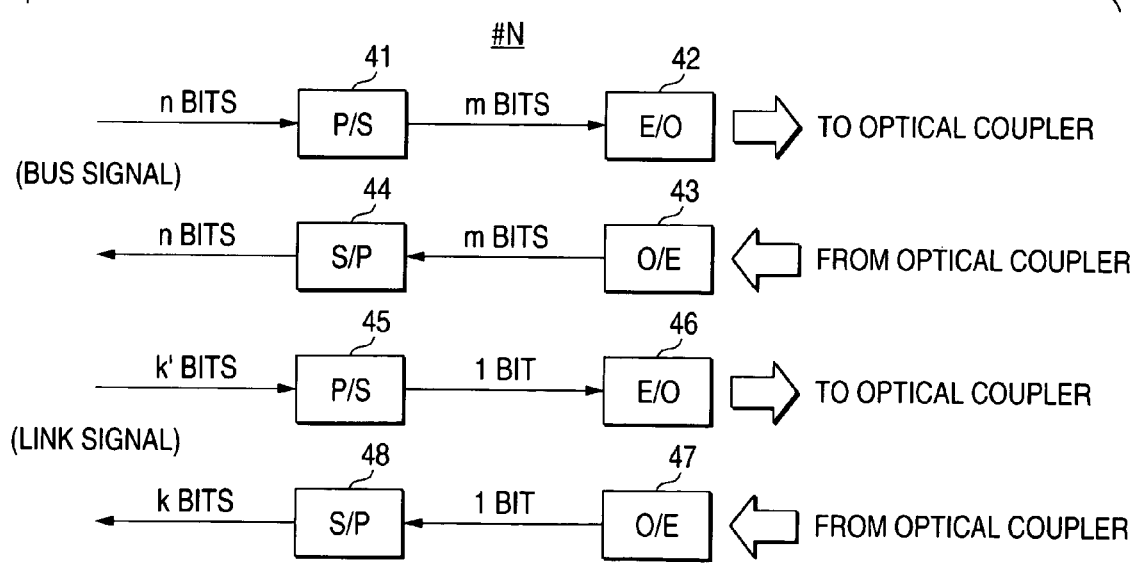
FIG. 4 is a block diagram showing an example of the configuration of a slave node in the case where both a bus connection and a link connection are enabled.

FIG. 4 is a block diagram showing an example of the configuration of the slave nodes in the case where both a bus connection and a link connection are enabled. In each of the slave nodes, as shown in the figure, a bus signal is received in the same sequence as that in the master node described above. Specifically, a serialized m-bit light signal which has been transmitted to the slave node via the optical coupler and the like is converted into an electric signal by an optoelectric converter 43, and the electric signal is parallelized in m:n by a serial/parallel converter 44 to be received as a bus signal. By contrast, transmission of a bus signal is conducted only by a slave node which is selected by an address data, a select data, or the like. The transmission sequence itself is identical with that in the master node described above. In the case where an n-bit bus signal is to be transmitted to the master node, specifically, the bus signal (parallel signal) is serialized in n:m by a parallel/serial converter 41 in accordance with the transmission speed. The m-bit serial signal is converted into a light signal by an electrooptic converter 42, and the light signal is transmitted via the optical coupler and the like.

By contrast, in reception of a link signal by the slave node, a serialized N-bit light signal is converted into an electric signal by an optoelectric converter 47, only a necessary 1-bit signal is selectively received, and the received signal is parallelized (in 1:k) by a serial/parallel converter 48 to be received as a k-bit parallel signal. In transmission of a link signal, a k'-bit signal is serialized (in k':1) by a parallel/serial converter 45, the serialized signal is allocated to a predetermined one bit of N bits, and a resulting signal is converted into a light signal by an electrooptic converter 46 to be transmitted as a link signal.

Figure 5:
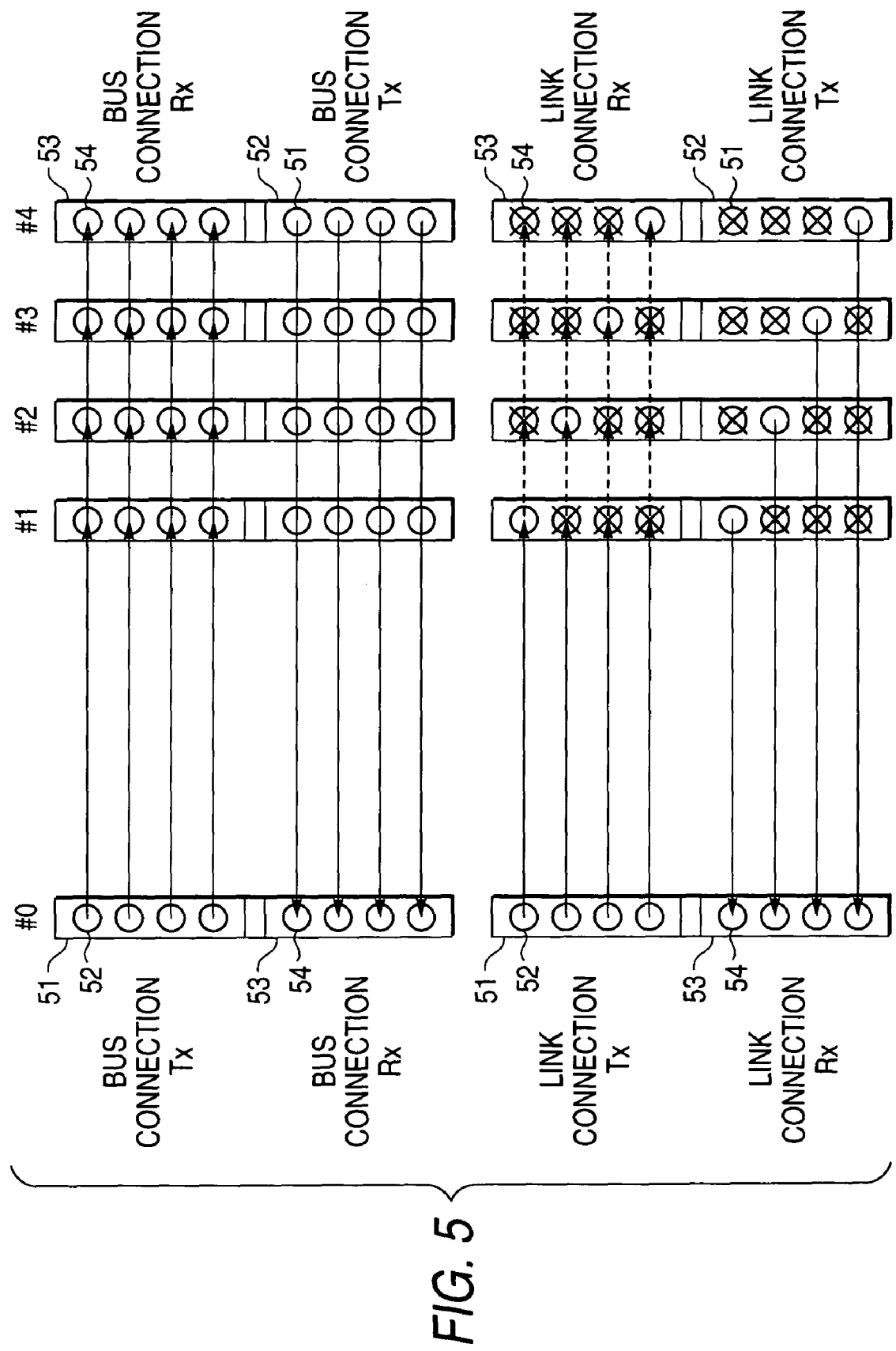
FIG. 5 is a diagram showing a specific example of an optical transmission apparatus in which both a bus connection and a one-to-one link connection are enabled.

FIG. 5 is a diagram showing a specific example of an optical transmission apparatus in which both a bus connection and a one-to-one link connection are enabled. In this example, a plurality of one-to-four couplers which are not shown are used. In the bus connection, four bits of a light signal are transmitted and received, and, in the link connection, one bit of a light signal is transmitted and received for each node. In the figure, Tx denotes a transmitter which comprises an optical connector 51 for connection with an optical transmission path such as an optical fiber, and light emitting elements 52, and Rx denotes a receiver which similarly comprises an optical connector 53 and light receiving elements 54.

In this example, the transmitter Tx for bus connection of the master node (#0) transmits four bits of a light signal. The light signal is transmitted via the optical couplers which are not shown. The receivers Rx for bus connection of the slave nodes (#1 to #4) receive the four bits of the light signal. The receiver Rx for bus connection of the master node (#0) receives four bits of a light signal transmitted from one (for example, #1) of the slave nodes which is selected by an address data, a select data, or the like. Among the transmitters Tx for bus connection of the slave nodes (#1 to #4), the transmitter of only one (for example, #1) of the slave nodes which is selected by an address data, a select data, or the like transmits four bits of a light signal. Each of the unselected slave nodes (#2 to #4) is controlled so as not to transmit a light signal until the slave node is selected.

By contrast, as required, the transmitter Tx for link connection of the master node (#0) transmits one bit of a light signal corresponding to one of the slave nodes (#1 to #4). The receiver Rx for link connection of each of the slave nodes (#1 to #4) selectively receives one bit of a light signal corresponding to the identification number of the slave node. Each of the slave nodes is controlled so that the bits indicted by x in the figure can enter the slave node but cannot be received by the slave node. The receiver Rx for link connection of the master node (#0) receives one bit of light signals respectively corresponding to the slave nodes. The transmitter Tx for link connection of each of the slave nodes (#1 to #4) transmits only one bit of a light signal corresponding to the identification number of the slave node. Each of the slave nodes is controlled so that the transmitter does not transmit light signals indicted by x in the figure which do not correspond to the identification number of the slave node.

In the above embodiment, the example (serialization in k:1) of a link connection has been described in which one bit is allocated to each of the slave nodes (#1 to #4). Alternatively, if necessary, several bits may be allocated to each of the slave nodes depending on the number of signals to be link-connected, the transmission speed, or the like.

According to the configuration, in an optical transmission apparatus in which both a bus connection and a link connection are enabled, all electrical connections can be replaced with optical connections. Since the same optical components can be used in both a bus connection and a link connection, an optical system can be realized by a simple configuration. The invention is particularly effective in a case where a link connection is conducted in the form of a multi-bit connection.

According to the invention, it is possible to obtain an optical transmission apparatus in which both a bus connection and a link connection are enabled in optical connections between plural nodes.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical transmission apparatus, comprising:
   a plurality of optical couplers; and
   a plurality of nodes interconnected via said plurality of optical couplers,
   wherein each of said nodes is controlled to transmit a signal for a bus connection and a one-to-one link connection via said optical couplers,
   said plurality of nodes comprise a master node connected to one end of said plurality of optical couplers, and a plurality of slave nodes connected to other ends of said plurality of optical couplers, and the master node is one-to-one connected to the plurality of slave nodes via the plurality of optical couplers.

2. The optical transmission apparatus according to claim 1, wherein said master node transmits and receives bit signals corresponding to the number of slave nodes for the link connection.

3. The optical transmission apparatus according to claim 2, wherein the bit signals corresponding to the number of slave nodes are serialized before being transmitted.

4. The optical transmission apparatus according to claim 1, wherein each of said slave nodes transmits a signal for the link connection, with allocating the signal to a predetermined bit.

5. The optical transmission apparatus according to claim 2, wherein each of said slave nodes receives only a bit signal of the signal for the link connection, which is necessary for each of said slave nodes.

6. The optical transmission apparatus according to claim 1, wherein each of the nodes is controlled to transmit the signal optically between the nodes.

7. The optical transmission apparatus according to claim 1, wherein said plurality of optical couplers branch and couple light according to a number of paths between nodes which at least transmit light.

8. The optical transmission apparatus according to claim 1, wherein each of said slave nodes and said plurality of optical couplers are connected by an optical transmission path.

* * * * *